May 12, 1931. J. C. GOODLET 1,804,684
COLLAPSIBLE MINNOW TRAP
Filed Feb. 12, 1930
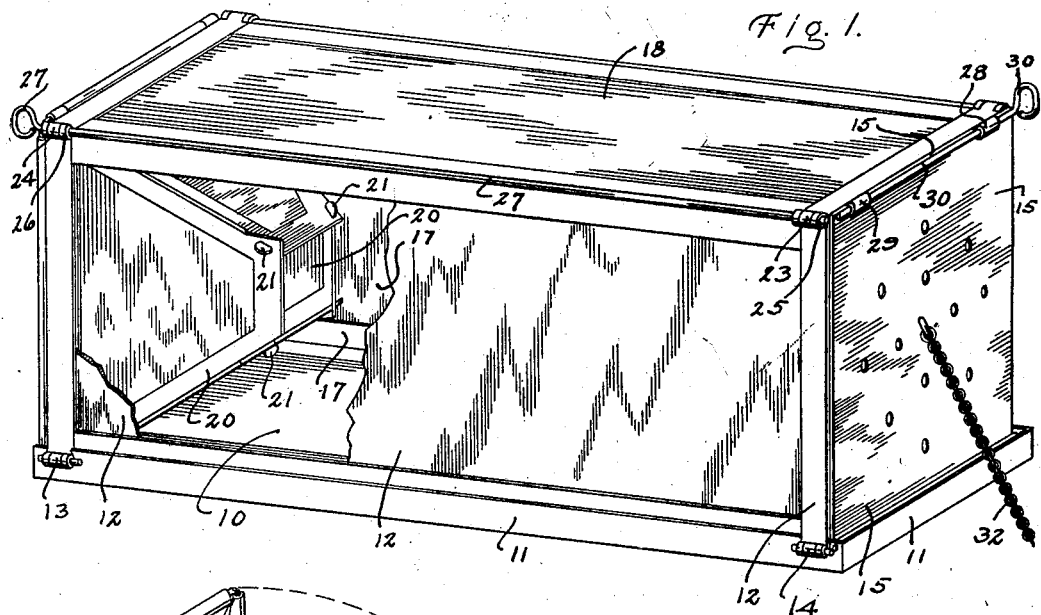
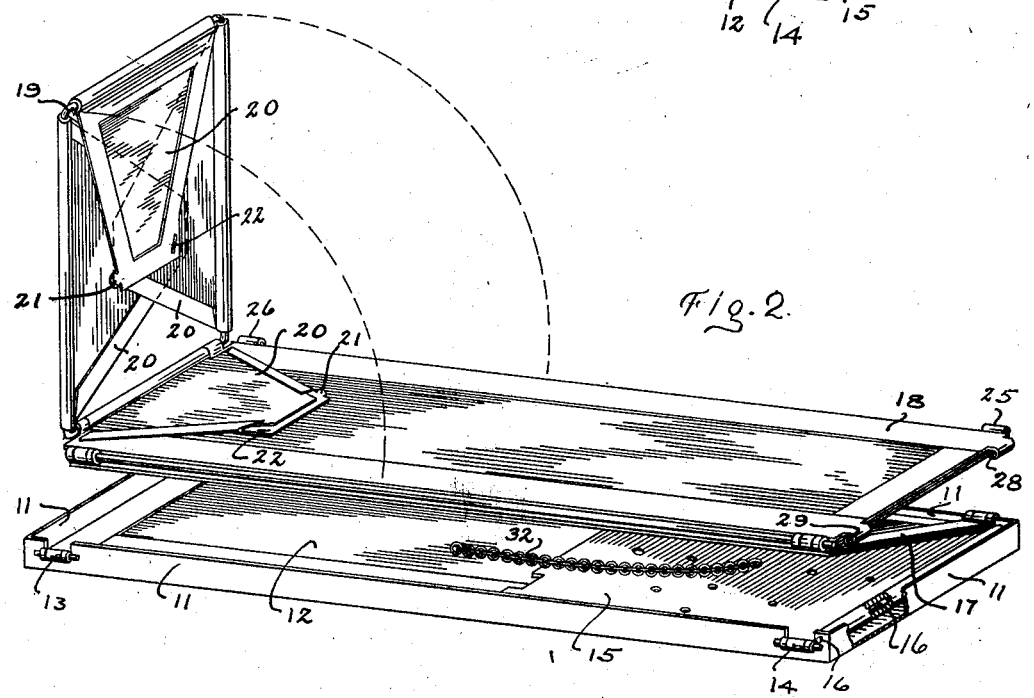
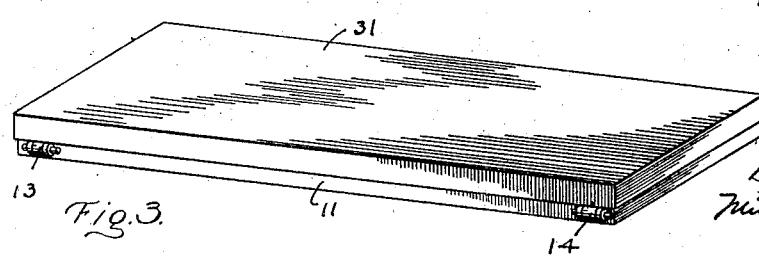
INVENTOR,
James C. Goodlet,
By
Minturn & Minturn,
Attorneys.

Patented May 12, 1931

1,804,684

UNITED STATES PATENT OFFICE

JAMES C. GOODLET, OF INDIANAPOLIS, INDIANA

COLLAPSIBLE MINNOW TRAP

Application filed February 12, 1930. Serial No. 427,765.

This invention relates to minnow traps and has for its primary object the provision of a structure whereby the trap may be collapsed to a folded flat package to occupy a minimum amount of space and to be secure from damage.

Other objects reside in the unique formation of the various members and in their assembly one to the other so that the trap may be opened and made available for use without the necessity of applying tools or bolts thereto, and in the peculiar formation of the members permitting the use of a multiple number of the same members and in providing extreme durability and long life of the entire structure.

These and other objects will become apparent in the following description of one particular form of the invention as shown by the accompanying drawings, in which—

Fig. 1, is a view in perspective of the minnow trap assembled and ready for use, a fragment of a side wall being removed to expose the interior construction;

Fig. 2, a view in perspective with the various members partly folded one over the other and approaching their closed position; and Fig. 3, a perspective view of the trap when completely folded and ready to be carried about.

Like characters of reference indicate like parts throughout the several views in the drawings.

I form a metal base 10 having an upturned flange 11 entirely therearound. To one longitudinal side of the base 10 I hinge a side wall 12 by means of the hinge joints 13 and 14 formed from the upwardly projecting flange therealong.

This side wall 12 is preferably made to have a metal framework which supports a central transparent medium such as isinglass, mica, or the product popularly known by the commercial trade name pyralin. This side wall 12 has its hinge joints on the flange 11 located so as to permit the wall 12 being folded inwardly to rest in contact across the base 10 within the flange. The dimensions of the side wall 12 permit its being received on the base 10 entirely within the flange therearound.

At the rear end of the base 10, I hinge the metal plate 15 by means of a rod 16 passed through a tube formed by rolling the edge of the end 15 therearound and out through each of the flanges on the longitudinal sides of the base 10. This rear end 15 is hinged and is of the proper dimensions to permit its being folded down flat over the side 12.

To the flange along the longitudinal side of the base 10 across from the side to which the side wall 12 is hinged, I hinge the side 17 which is so hinged, and has the proper dimensions to permit its being swung down over the side 12 with the rear end 15 therebetween to come within the flange 11 around the base 10. This side 17 also preferably has a central transparent closure corresponding to that in the side 12. To the outer free longitudinal edge of the side 17, I hinge the top wall 18 which is of substantially the same dimensions as those of the sides 12 and 17. This top 18 has a central transparent closure corresponding to that in the sides 12 and 17.

To the end of the top 18, which end will be designated as the front end, I hinge a rectangular frame 19, here shown as a wire bent to a rectangular shape to have a width and length approximating that of the rear end 15.

On each of the four sides of the frame 19 is hinged a wing 20 which has its base extending substantially along the entire length of the side and having the sides of the wing set at acute angles with the base and joint at their outer ends by a transverse bar parallel to the base, forming in effect a trapezoid having the shape of a symmetrical triangle with the apex removed. Each of the four wings 20 has a central transparent medium of the type employed in the side and top members. An ear 21 projects laterally from one side of each of the wings near the outer end and in the framework on the other side of the wing is a slot 22 adapted to receive therethrough the ear 21 of the next adjacent wing. The wings 20 are so positioned on the frame 19 as to have a slot 22 in one wing presented to receive an ear 21 in the next adjacent wing as the wings may be swung toward each other.

Referring now to Fig. 1, the minnow trap is erected for use by bringing the side walls 12 and 17 to vertically disposed positions, swinging the top 18 around over and toward the upper edge of the side 12 and swinging the rear end 15 to an upwardly vertical position. The upper end of the side 12 is provided with eyes 23 and 24 and the outer free edge of the top 18 is provided with corresponding eyes 25 and 26 so that a pin 27 may be passed through all of the eyes and thereby interconnect the top 18 with the side 12. The rear end of the top 18 is also provided with eyes 28 and 29 and the rear end 15 is notched to permit its being closed against the rear end of the top 18 to permit the eyes 28 and 29 to project through the notches and to receive the pin 30 therethrough so as to retain the rear end.

The frame 19 with its affixed wings 20 is swung downwardly and the wings swung one toward the other to have the ears 21 inserted through the respective slots 22 so as to produce the funnel like entrance to within the trap, this entrance being a truncated pyramid when the parts are so assembled. The lower end of the frame 19 comes within the end flange projecting from the base 10 and the sides of the frame strike the ends of the sides 12 and 17 so that the frame 19 is held in a vertical position. The frame is brought to this position prior to the insertion of the pin 27 in securing the top 18 to the side 12.

Referring to Fig. 2, the pins 27 and 30 are withdrawn to collapse the structure to a carrying position, the top 18 lifted upwardly, the side wall 12 dropped inwardly onto the base 10, the rear end 15 dropped over the side 12, and the frame 19 swung outwardly and the wings disengaged one from the other by springing the ears 21 out of the respective slots 22 and each wing swung around to within the plane of the frame 19 so as to permit the frame being folded down on what was the under side of the top 18. The top 18 is folded around to be positioned over the outer side of the side 17, which side 17 is then folded inwardly over the base 10 and all of the parts pressed down between the flange 11 to permit the placing of a cover 31 thereover in frictional engagement with one flange. The rear end 15 is preferably perforated and has a chain 32 fixed thereto as a means for anchoring the trap when in use.

While I have here shown and described my invention in the one form as now best known to me, it is entirely obvious that many structural changes may be made therein without departing from the spirit of the invention, and I, therefore, do not desire to be limited to that precise form nor any more than may be required by the following claims.

I claim:

1. In a minnow trap, a base, enclosing walls hinged thereto, and an entrance funnel formed of wings detachably securable one to the other by an ear in one passed through a slot in the other, all of said parts being proportioned to permit of their being folded to form a flat compact package within the confines of the base.

2. A collapsible minnow trap comprising a base enclosing side walls having inside marginal flanges and an end hinged thereto, an enclosing top hinged to one of said side walls, and an entrance funnel hinged to one of said enclosing members, said funnel comprising an open frame contacting the end flange of the side walls in open position of the trap, a plurality of wings hinged to an open frame and adapted to be detachably engaged one to the other, said wings having outer ends reduced in length as compared to the hinged ends and having an ear in each entering a slot in a next adjacent one.

3. In a minnow trap, an entrance funnel comprising, a frame having a plurality of sides, and wings hinged to said sides, each of said wings having sides sloping inwardly one toward the other to an edge removed from the frame, and having an ear in each entering a slot in the next adjacent one for detachably engaging the next adjacent wing.

4. In a minnow trap, an entrance funnel comprising, a frame having a plurality of sides, and wings hinged to said sides, each of said wings having sides sloping inwardly one toward the other to an edge removed from the frame, and having a member for detachably engaging the next adjacent wing, said engaging member being an ear projecting from the wing, and the other side of the wing having a slot therethrough to receive the ear of the next adjacent wing consecutively around the junctures of the wings.

5. In a collapsible minnow trap, a base, a rear end hinged thereto, a side wall hinged to the base, a second similar side wall hinged to the base, a top hinged to the second side wall and foldable together in the order named, means for detachably securing the top and the end to the said first side wall to form a chamber open at the front end, a frame hinged to said top at the end removed from said rear end, said frame being formed to have dimensions substantially equal to the opening of said front end, and a wing hinged on each side of the frame tapered in width to an outer end and means for detachably holding said wings one to the other when swung inwardly through said front end to form an entrance funnel having an opening therethrough as defined by the outer ends, said wings having an ear in each entering a slot in a next adjacent one.

In testimony whereof I affix my signature.

JAMES C. GOODLET.